United States Patent Office 3,357,556
Patented Dec. 12, 1967

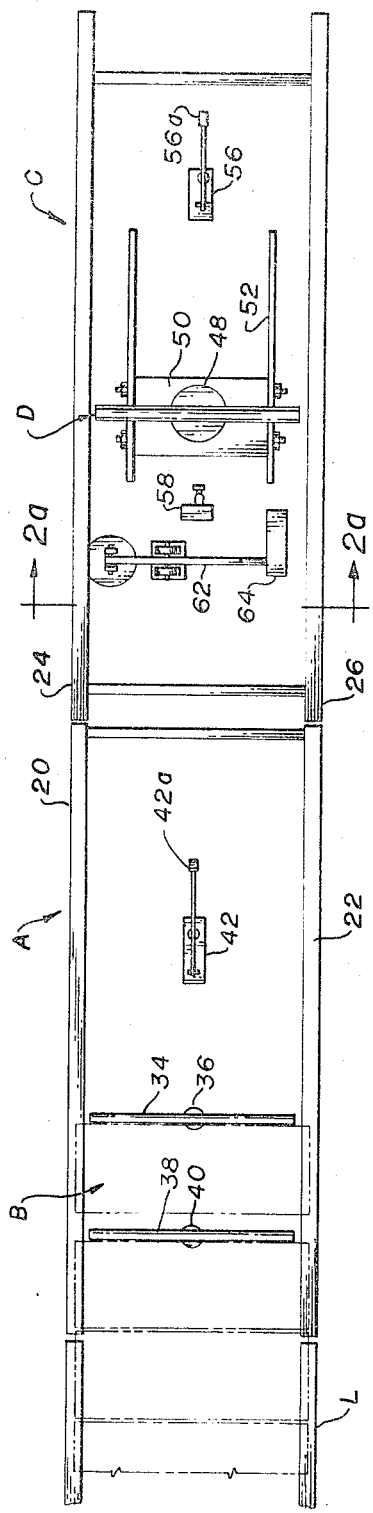
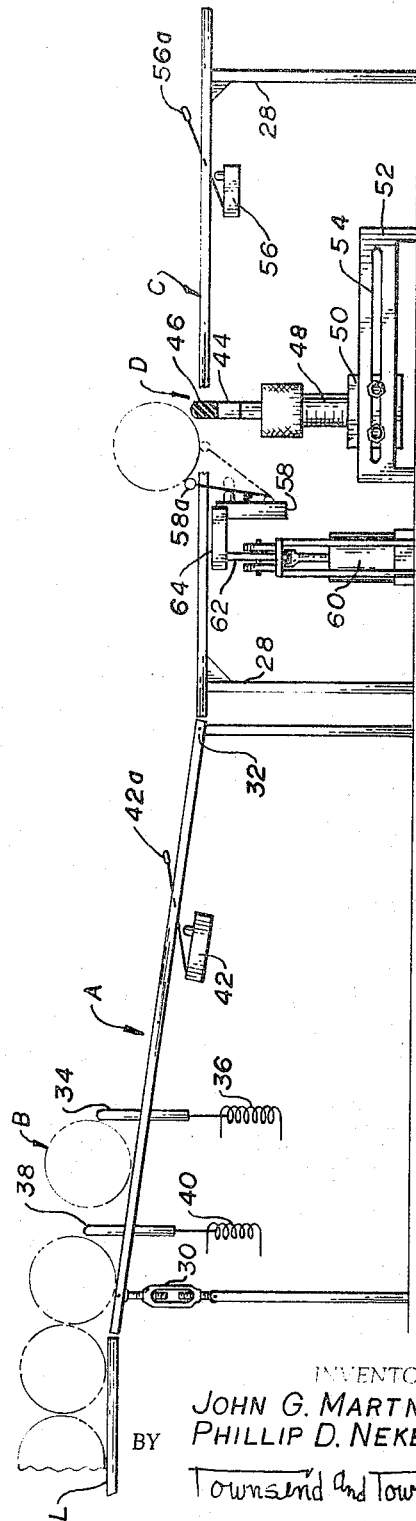

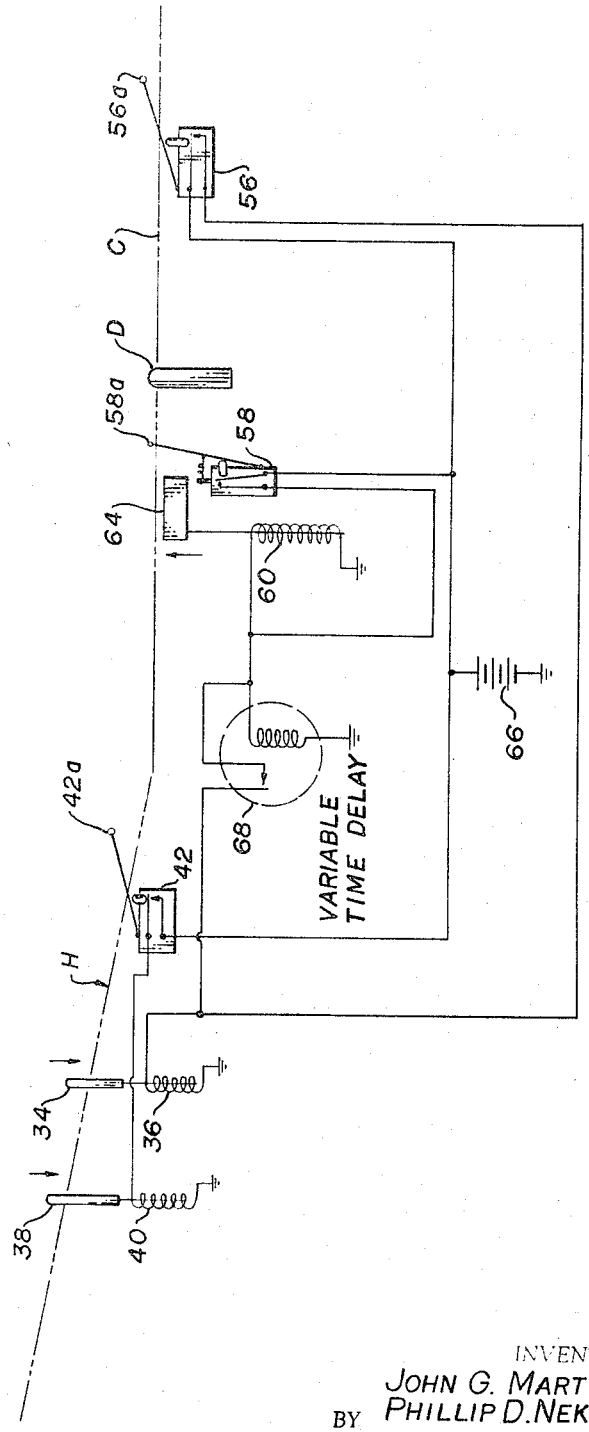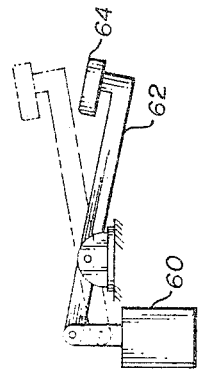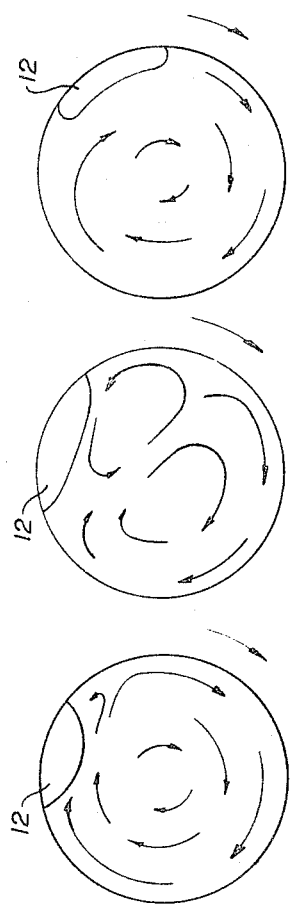

3,357,556
NON-DESTRUCTIVE TESTING METHOD AND
APPARATUS FOR CANNED LIQUID MATERIAL
John G. Martner, Atherton, and Phillip D. Neketin,
Menlo Park, Calif., assignors, by mesne assignments, to
Gerber Products Company, Fremont, Mich., a corporation of Michigan
Filed June 14, 1965, Ser. No. 463,679
8 Claims. (Cl. 209—73)

This invention relates to apparatus for testing canned liquid material without removing the material from the can and to a method of so testing canned material.

Canned liquid comestibles, such as batch-prepared infant formula, may experience, both during and after sealing in a can or like container, alteration in viscosity distribution, or increase in viscosity, either of which renders the material unacceptable. Alteration in viscosity distribution is typically manifested by formation of curds or like semi-solid bodies. Increase in viscosity occurs as the liquid material ages and is denominated "age-thickening." Both age-thickening and alteration of viscosity distribution effect change in the characteristics of the canned liquid. Such change is exploited in the present invention for testing cans of material and rejecting the unacceptable cans. In the invention cans containing the liquid are rolled along a horizontal path at a preselected constant speed; in the path is disposed a narrow barrier having a height that is small with respect to the diameter of the can. It has been found that by proper adjustment of the height of the barrier, cans containing liquid material that is satisfactory will pass over the barrier whereas cans containing spoiled or age-thickened material will be arrested by the barrier. The apparatus of the present invention provides means for rejecting or expelling cans that are arrested by the barrier.

The principal object of the present invention is to provide an apparatus and method for testing canned liquid material without removing the contents from the can or otherwise affecting or opening the can.

Another object is to provide method and apparatus for rapidly so testing canned material that the apparatus can be installed in existing high speed processing lines.

These and other objects will be more apparent after referring to the following specification and accompanying drawings in which:

FIG. 1 is a side elevation view of testing apparatus according to the present invention;

FIG. 2 is a top plan view of the apparatus of FIG. 1;

FIG. 2A illustrates an ejecting device according to the present invention;

FIG. 3 is an electrical schematic diagram showing the automatic control circuitry of the present invention;

FIG. 4 is a diagrammatic depiction of motion of satisfactory liquid material in a can that is rolling on a horizontal path;

FIG. 5 is similar to FIG. 4 but showing the pattern of motion of spoiled liquid material; and FIG. 6 is similar to FIG. 4 but showing the pattern of motion of age-thickened liquid material.

Referring more particularly to the drawings, reference character A indicates an inclined plane down which cans B of infant formula, or other like liquid products, are caused to roll. The apparatus is typically installed as part of a conventional can processing line L. In can receiving relationship to inclined plane A is a horizontal plane C having therein a barrier D. Acceptable cans will pass over or jump over barrier D and will proceed along plane C to other conventional can handling apparatus. Cans containing unacceptable material will not pass over barrier D and are arrested thereby for explusion from the line by apparatus to be described in more detail hereinafter.

Referring to FIGS. 4–6 there is shown in diagrammatic form the flow pattern of canned liquid material each figure depicting the material in a different state. The figures are thought to explain the theory of operation of the present invention, but it is to be understood that the accuracy of the theory in no way influences the scope of the invention. Rotary motion is induced in the liquid by viscous coupling with the inner surface of the rotating can. Referring first to FIG. 4, a diagram of flow of acceptable liquid material in a can moving from left to right, it will be noticed that the air space 12 is only slightly advanced in the direction of rotation and that but slight turbulence or discontinuous flow exists in the liquid. Accordingly, when a can containing liquid moving as shown in FIG. 4 encounters a barrier, insignificant disruption or "slushing" of the fluid takes place, and the can passes over or jumps over barrier D.

In FIG. 5, wherein the flow pattern of spoiled material is shown in diagrammatic form, it will be noted that severe turbulence and discontinuous flow exists as the can rolls from left to right. This can be explained, at least in part, by considering that on spoilage of milk products such as infant formula, and the like, curds or like semi-solid bodies form, which bodies are more dense than the liquid itself. Such different densities effect variation in degree of viscous coupling with the can inner surface which causes turbulent flow. Accordingly, when a can with a flow pattern as that depicted in FIG. 5 encounters a barrier, the turbulence or "slushing" of the liquid in the material prevents passage over the barrier by imparting a component in the reverse direction from the momentum of the rolling can. Accordingly, a can containing spoiled material does not pass over barrier D.

FIG. 6 depicts a flow pattern of canned liquid material that has thickened with age. The thickening or increase in viscosity has been found to take place substantially uniformly throughout the material. Consequently, increased viscous coupling between the material and the can inner surface occurs. Increased viscous coupling causes a shift in the air space in the direction of rotation. Accordingly, the weight distribution of the can is such that the force due to momentum acting at the right or leading portion of the can is less than the force of gravity acting on the trailing portion of the can. By judicious adjustment of the barrier D, the asymmetry of the can in this respect is utilized to prevent the can from passing over the barrier.

Although the theoretical justification for arrest by barrier D in the case of spoiled milk is different from that in the case of age-thickened milk, both types of spoilage are detected by the present invention.

Referring now to FIGS. 1–3, the apparatus will be seen to include, as forming inclined plane A, laterally spaced apart tracks 20 and 22 which are so spaced with respect to one another that cans B are supported for rolling movement thereby. Horizontal track portion C has similarly spaced apart horizontal members 24 and 26. Members 24 and 26 are fixedly supported on structural frame members 28, while members 20 and 22 forming inclined track A are mounted for adjustment by an expedient here exemplified by a turnbuckle 30. Slanted track A on the end opposite turnbuckle 30 is pivotally mounted at 32. Thus it will be seen that adjustment of turnbuckle 30 affords adjustment of the slope of inclined plane A. Carried by inclined plane A adjacent the upper end thereof is a gate 34 that spans the space between members 20 and 22 to arrest movement of cans B. Associated with gate 34 is a solenoid 36 energization of which pulls the gate downwardly to permit a can to pass. Upstream of gate 34 and spaced therefrom by an amount somewhat in excess of the diameter of a can B is a second gate 38 which in the normal or up position inhibits entry of a can B into a position behind gate 34. Associated with gate 38 is a solenoid 40 energization of which draws gate 38 downwardly to permit passage of a can. Downstream of gate 34 is a switch 42 which has normally open contacts that are closed when a can rolls down the inclined plane and contacts switch actuator 42a.

Spaced downstream of the point of intersection between inclined plane A and flat plane C is a barrier D that spans the space between members 24 and 26 and extends upwardly into the path of travel of the cans along the flat plane. In FIG. 1 barrier D is shown as including a steel or like structural base 44 having bonded thereto a rubber or neoprene strip 46, the strip extending into the path of can travel. Although the invention is not considered as limited to a neoprene or like resilient barrier, it has been found that such barrier promotes the "slushing" effect when the cans strike the barrier, and therefore improves the ability of the device to discriminate between cans of satisfactory and unsatisfactory product. Barrier base 44 is carried by a micrometer-type adjusting mechanism 48 which is supported on a base 50. Base 50 is carried on a supporting structure 52 by engagement through an elongate slot 54 in the base so that barrier D is adjustable both vertically and longitudinally of the path of can travel.

Cans containing satisfactory product will pass over barrier D and will contact an actuator 56a of a normally open switch 56. Closure of switch 56 causes energization of solenoid 36 thereby opening gate 34 to release another can B for rolling movement down inclined plane A. Cans containing unsatisfactory product do not pass barrier D, but rather roll backwardly thereof. On such backward movement the cans contact an actuator 58a of a switch 58 that has normally open contacts. Closure of such contacts energizes a solenoid coil 60 the armature of which is operatively connected to a lever 62 that drives a ram 64 upwardly to expel cans laterally of flat plane C.

In FIG. 3 is shown schematically a circuit for interconnecting the solenoid and switches. In the figure a power source 66 is provided for energizing the solenoid coils. It will be seen that a can released from gate 34 will close the contacts of switch 42 thereby energizing solenoid 40 to admit another can behind gate 34. If the can that so closes switch 42 contains acceptable product, it will pass over the barrier and will effect closure of switch 56 located downstream of the barrier. Closure of the contacts of the switch 56 will connect power source 66 to solenoid 36 thereby lowering gate 34 to release another can for rolling movement down inclined plane A. If the contents of a can are spoiled or age-thickened, the can will not pass barrier D but will "bounce" off the barrier and roll backwardly. In such backward movement actuator 58a will be contacted to close the contacts of switch 58. Such closure establishes a circuit from power source 66 to solenoid 60 thereby driving ram 64 upwardly to expel the unsatisfactory can. Additionally, closure of the contacts of switch 56 supplies power to a variable time delay relay 68. Time delay relay 68 has normally open contacts which close only after a preselected delay. Upon closure of the contacts of the time delay relay power is supplied from source 66 through the contacts of switch 58 and those of the time delay relay to solenoid 36 which opens gate 34 to release another can. The time delay afforded by relay 68 is preferably adjustable to accommodate varying line speeds. Only sufficient time delay to permit expulsion of an unsatisfactory can is necessary.

The location and height of barrier D can best be determined empirically depending on the various operating parameters such as angle of slope of inclined plane A, viscosity of liquid material in cans B, percentage of volume of can filled with liquid, temperature of contents of the cans, and like variables. In one installation of the present invention a height of .080 inch for barrier D was used in a structure where inclined plane A was mounted at an angle of 6° 38′ with respect to horizontal. Excellent results were obtained from such apparatus.

Thus it will be seen that the present invention provides for the non-destructive and substantially automatic testing and sorting of canned liquid materials of the type wherein spoilage influences the viscosity of the material.

Although one embodiment of this invention has been shown and described, it will be apparent that other adaptations and modifications can be made without departing from the true spirit and scope of the invention.

What is claimed is:

1. Apparatus for testing cylindric cans of liquid material of the type that experiences a viscosity increase with age and in which curds of relatively dense constitution form on spoilage of the liquid material, said apparatus comprising means defining a horizontal path for supporting the cans for rolling movement therealong, means for serially feeding the cans to said path in constant rate of rotation about the cylindric axis of the cans, a barrier in said path aligned transversely thereof, means for establishing the barrier at a location in said path such that cans containing satisfactory liquid material pass over the barrier and cans containing age-thickened and spoiled material are arrested by the barrier, and means for expelling from said path cans that are arrested by said barrier.

2. The invention of claim 1 wherein said can feeding means comprises means defining an inclined plane intersecting said path at a site spaced from said barrier and gating means for serially releasing said cans from a fixed point on said inclined plane for rolling movement down said plane to said horizontal path.

3. The invention of claim 2 including means for adjusting the slope of said inclined plane to effect selection of the rate of rotation of cans fed thereby to said horizontal path.

4. The invention of claim 1 wherein said barrier location establishing means comprises a base, means for adjustably positioning said base longitudinally along said path, means for mounting said barrier to said base, said mounting means including means for adjusting the height of said barrier relative said base.

5. Apparatus for testing cylindric cans of liquid material of the type that experiences a viscosity increase with age and in which curds of relatively dense constitution form on spoilage of the liquid material, said apparatus comprising, in combination with a can conveying line, an inclined track in can receiving relation to said conveying line, a first gate in said inclined plane for arresting cans conveyed to said inclined plane from said line, a second gate spaced along said inclined plane from said first gate by an amount at least equal to the diameter of one of the cans, first sensing means spaced along the inclined plane from said second gate for opening said first gate in response to a can rolling past said first sensing means, means defining a horizontal path for receiving cans rolling from said inclined plane, a barrier in said path aligned transversely thereof, means for establishing the barrier at a location in said path such that cans containing satisfactory liquid material pass over the barrier and cans containing age-thickened and spoiled material are arrested by the barrier, second sensing means spaced along said path from said barrier for opening said second gate in response to a can passing said second sensing means, and means for expelling from said path cans that are arrested by said barrier.

6. Apparatus for separating uniformly-filled cans containing liquid material having first viscosity characteristics from cans containing liquid material having second viscosity characteristics, comprising: means for advancing said cans along a path at a rate of rotation sufficient to develop internal liquid flow characteristics that correspond to the viscosity characteristics of the respective liquid materials in said cans; means forming an upstanding transverse barrier in said path for preventing continued advancement of only those cans that contain liquid material having said first viscosity characteristics; and means adjacent said barrier for expelling from said path those cans that are prevented from continued advancement by said barrier.

7. Apparatus in accordance with claim 6 wherein said advancing means includes an inclined plane.

8. The method of separating uniformly-filled cans containing liquid material having first viscosity characteristics from cans containing liquid having second viscosity characteristics, comprising the steps of: advancing said cans along a path at a rate of rotation sufficient to develop internal liquid flow characteristics that correspond to the viscosity characteristics of the respective liquid materials in said cans; providing an upstanding transverse barrier in said path for preventing continued advancement of only those cans that contain liquid material having said first viscosity characteristics; and expelling from said path those cans that are prevented from continued advancement by said barrier.

References Cited
UNITED STATES PATENTS

| | | | |
|---|---|---|---|
| 2,159,117 | 5/1939 | Tratsch et al. | 194—100 |
| 2,331,478 | 10/1943 | Kellog | 73—52 |
| 2,339,638 | 1/1944 | Henszey et al. | 209—115 X |
| 2,763,356 | 9/1956 | Tratsch | 194—101 |

M. HENSON, WOOD, JR., *Primary Examiner.*

ALLEN N. KNOWLES, *Examiner.*